Oct. 12, 1926.  
W. J. SIX  
1,602,509  
MACHINE FOR CUTTING PISTON RINGS  
Filed June 13, 1925
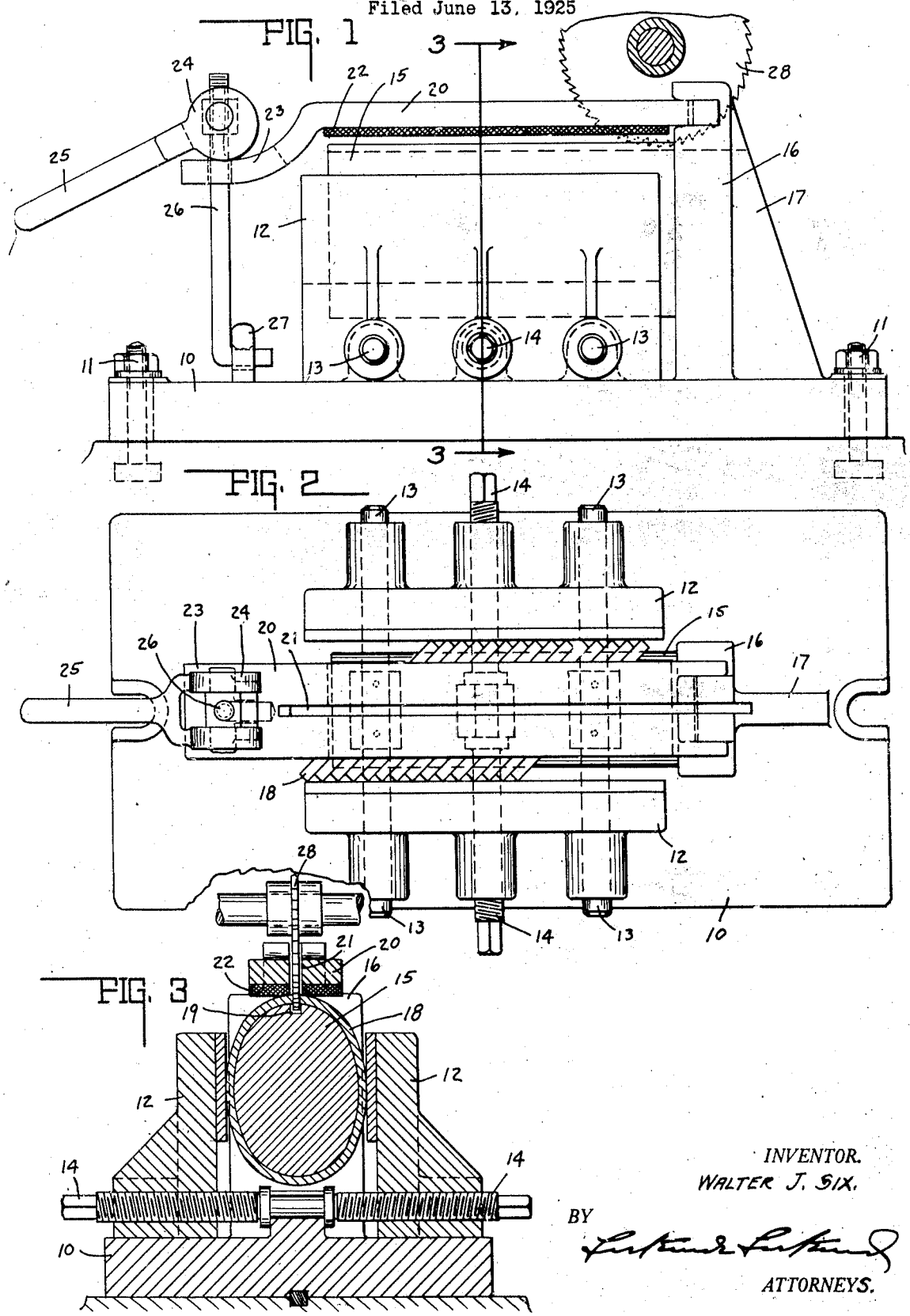
INVENTOR.  
WALTER J. SIX.  
BY  
ATTORNEYS.

Patented Oct. 12, 1926.

1,602,509

UNITED STATES PATENT OFFICE.

WALTER J. SIX, OF INDIANAPOLIS, INDIANA.

MACHINE FOR CUTTING PISTON RINGS.

Application filed June 13, 1925. Serial No. 36,880.

This invention pertains to a means for cutting piston rings or the like, wherein the rings are cut at an angle or on the bias.

The object of the invention resides in the method of cutting a plurality of piston rings or objects of similar character, and particularly wherein the rings are first formed in a continuous spiral formation, said cutting operation being adapted to cut the rings at an angle to the plane therethrough, or on the bias, as is customary with the usual type of piston ring. As herein disclosed, this is done by a single operation in such a manner that any number of rings may be cut at one time as will be hereinafter more fully set forth and described.

The full nature of the invention will be understood from the accompanying drawings and the following description and claims.

Fig. 1 is a side elevation of the machine employed in the process. Fig. 2 is a plan view thereof. Fig. 3 is a section taken on a line 3—3 of Fig. 1.

In the process of forming piston rings in accordance with the disclosure in my application, Serial No. 38,518 filed June 20, 1925, the piston rings or similar articles are formed by a rolling process from stock strips of material of substantially the desired size and formation in cross section. The material is rolled into a continuous springlike spiral formation as it reaches the forming or rolling machine, after which it is only necessary to cut each loop at an angle or on the bias to form individual split piston rings of the usual character.

As shown herein, the machine for that purpose comprises a base 10, rigidly secured upon a suitable machine by the bolts 11, and having a pair of vice-like jaws 12 slidably mounted on a pair of guide rods 13, supported laterally of said base. Intermediate said guide rods there is provided an oppositely threaded screw shaft 14 rotatably supported at the center on a central projection of the base as shown in Fig. 3, whereby upon turning the screw shaft 14, the jaws are brought together or moved apart in the usual manner.

Rigidly supported between said jaws there is an arbor 15 which is oval in cross section, its greater diameter extending vertically. Said arbor is supported at one end by a clamping support 16 having a strengthening rib 17 in such manner as to secure it rigidly between the jaws, free from engagement, so as to permit the spirally formed rings 18 to be freely slipped over the front end thereof. By reason of the oval shape of the arbor, the rings will loosely rest thereon until the clamping jaws are brought together so as to turn the spirally formed rings 18 to the position shown in Fig. 2. In this position it will be noted that said rings will be securely held and engaged against the sides of the arbor and extend at an angle thereabout. This action brings the rings to such a position that the slot 19, formed longitudinally and centrally along the top surface of the arbor, will transverse said rings at the desired angle to be cut, which in this instance is shown at approximately 45°.

Pivotally or removably secured at one end to the arbor support 16, there is a clamping bar 20 provided with the slot 21 extending centrally and longitudinally thereof, and having on its lower surface a pad of fabric 22. Said clamping bar is adapted to be brought into clamping position over the top of said arbor so as to securely clamp the top portion of the rings thereon as shown in Fig. 3. The free end thereof is curved downwardly as shown at 23 to receive an eccentric clamp 24 provided with a handle 25. Said clamp is adjustably secured to a hooked clamp bolt 26 connected at its lower end to the lug 27 secured to the base 10.

After the group of spirally formed rings have been mounted on the arbor and clamped thereon in their angular position at both the sides and top, as shown in Figs. 2 and 3, a suitable cutting tool, such as a knife or cutting saw 28, is brought into engagement therewith through the slot 21 so as to cut through the rings at an angle, in line with the slot 21 and the groove 19 into which it extends. After the cutting tool is passed longitudinally through the slot 21 so as to cut the rings, the clamping bar 20 and the jaws 12 are released and the rings removed from the arbor, separated and slit, or cut at an angle in the usual fashion of piston rings. The rings are then ready for use.

The invention claimed is:

1. A cutting machine for cutting piston rings or the like, including an arbor of substantially oval shape in cross section, means for clamping a plurality of rings against the sides of said arbor and causing the same to twist thereon and engage the side surfaces thereof at an angle to the cross section therethrough, and a cutting tool adapted to engage said rings longitudinally of the surface of said arbor for cutting the same at an angle to the plane therethrough.

2. A cutting machine for cutting piston rings or the like, including a base, an arbor rigidly secured at one end upon said base and spaced therefrom, said arbor being provided with a groove extending longitudinally thereof and being of greater diameter therethrough, means for clamping a plurality of rings on said arbor, a pair of jaw members, means for causing said jaw members to engage said rings and twist them on said arbor so as to lie at an angle to the diametric plane through said groove and clamp them rigidly thereon, and a cutting tool adapted to pass through a longitudinal slot in said first mentioned clamping means and extend into said groove for cutting said rings at an angle thereto.

3. A machine for cutting piston rings or the like, including a base portion, an arbor substantially oval in cross section and formed with a groove extending longitudinally of the surface thereof, said arbor being of greater diameter through said groove, means for rigidly supporting one end of said arbor spaced from the base portion of said machine, a clamping bar secured at one end of said arbor support and having a longitudinal slot therethrough adapted to coincide with said groove when in clamping position over said arbor, a clamping member adapted to engage the free end of said clamping bar for clamping a plurality of rings against the top of said arbor, a pair of jaw members slidably mounted on said base portion at each side of said arbor, means for forcing said jaw members against the opposite sides of said arbor for engaging said rings and twisting them at an angle thereto, and a cutting member adapted to be passed through the slot in said clamping bar and extend into said groove for cutting the angularly clamped rings at an angle to the plane therethrough.

4. A cutting machine for cutting piston rings or the like, including a supporting arbor and a pair of clamping members disposed on opposite sides of said arbor adapted to engage said rings and force them directly against the sides of said arbor for positioning them in a transverse plane at an angle thereto, and means for cutting said rings longitudinally of said arbor and at an angle to the respective planes therethrough.

5. A cutting machine for cutting piston rings or the like, including a supporting arbor and a pair of clamping members disposed on opposite sides of said arbor adapted to engage said rings and force them directly against the sides of said arbor for positioning them in a transverse plane at an angle thereto, a guide clamp removably mounted over said rings and having a slot extending longitudinally of said arbor, and a rotary cutting member adapted to travel longitudinally of said arbor and within said slot for cutting said rings at an angle to their respective planes.

6. A cutting machine for cutting piston rings or the like, including a supporting arbor, spirally wound piston ring material mounted over said arbor, means for directly clamping said spirally wound material directly against the sides thereof for distorting the same and causing the spirals thereof to extend at an angle to the longitudinal plane of said arbor, and means for cutting said spirally wound material longitudinally of said arbor for separating the same into individual piston rings, substantially as set forth and described.

In witness whereof, I have hereunto affixed my signature.

WALTER J. SIX.